(12) United States Patent
Belford et al.

(10) Patent No.: US 9,225,827 B2
(45) Date of Patent: *Dec. 29, 2015

(54) PROACTIVE CALLER-CONTEXT SYSTEMS AND METHODS

(71) Applicant: WhitePages, Inc., Seattle, WA (US)

(72) Inventors: Morgan Kennedy Belford, Seattle, WA (US); Devin Efraim Ben-Hur, Seattle, WA (US); Sebastian Beresniewicz, Seattle, WA (US); Owyn More Richen, Seattle, WA (US); Timothy John Satterfield, Seattle, WA (US)

(73) Assignee: WhitePages, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/290,825

(22) Filed: May 29, 2014

(65) Prior Publication Data

US 2014/0274003 A1    Sep. 18, 2014

Related U.S. Application Data

(63) Continuation of application No. 14/035,772, filed on Sep. 24, 2013, now Pat. No. 8,781,453.

(60) Provisional application No. 61/769,093, filed on Feb. 25, 2013.

(51) Int. Cl.
*H04M 3/42* (2006.01)
*H04W 4/16* (2009.01)

(52) U.S. Cl.
CPC ...... *H04M 3/42042* (2013.01); *H04M 3/42076* (2013.01); *H04W 4/16* (2013.01)

(58) Field of Classification Search
CPC ............ H04M 3/42042; H04M 1/575; H04M 3/42076; H04W 48/08; H04W 76/02; H04W 4/16
USPC .......................... 455/415, 412.1, 412.2, 414.1
See application file for complete search history.

(56) References Cited

U.S. PATENT DOCUMENTS

| | | | |
|---|---|---|---|
| 7,564,960 B2 * | 7/2009 | Urban et al. ............. | 379/142.01 |
| 8,081,740 B2 * | 12/2011 | Reynolds et al. .......... | 379/88.21 |
| 8,781,435 B2 * | 7/2014 | Tinnakornsrisuphap et al. ............................ | 455/403 |
| 2002/0027981 A1 * | 3/2002 | Bedrosian et al. ....... | 379/201.08 |
| 2007/0105537 A1 * | 5/2007 | Mahajan et al. .............. | 455/415 |

* cited by examiner

*Primary Examiner* — Olumide T Ajibade Akonai
(74) *Attorney, Agent, or Firm* — AEON Law; Adam L. K. Philipp

(57) ABSTRACT

A directory server may proactively provide to a remote mobile phone (or similar device) recent contextual information associated with callers who are likely to call the remote mobile phone, such that the remote mobile phone is likely to have a local set of recent contextual data about a given caller when the caller places a call to the remote mobile phone (or visa versa). When an unknown caller calls the remote mobile phone, the directory server may use the caller's phone number to identify directory information and one or more social-network or similar accounts that are used as sources of contextual information about the caller.

18 Claims, 6 Drawing Sheets

PROACTIVE CALLER-CONTEXT SYSTEMS AND METHODS

CROSS-REFERENCE TO RELATED APPLICATIONS

This application is a continuation of U.S. patent application Ser. No. 14/035,772; filed Sep. 24, 2013; titled "SOCIAL CALLERID SYSTEMS AND METHODS"; and naming inventors Morgan Kennedy BELFORD et al. US patent application Ser. No. 14/035,772 claims the benefit of priority to U.S. Provisional Patent Application No. 61/769,093; filed Feb. 25, 2013; titled "SOCIAL CALLERID SYSTEMS AND METHODS"; and naming inventors Morgan Kennedy BELFORD et al. The above-cited applications are hereby incorporated by reference in their entireties for all purposes.

FIELD

The present disclosure relates to the field of computing, and more particularly, to a directory server that identifies and proactively provides to a remote mobile telecommunications device recent contextual information associated with callers who are likely to call the remote mobile phone in the near future.

BACKGROUND

Caller ID is a telephone service that transmits a caller's number to the called party's telephone equipment during the ringing signal, while the call is being set up but before the call is answered. Caller ID is currently available in analog and digital phone systems and most voice over Internet Protocol applications. In some cases, caller ID can also provide a name associated with the calling telephone number. The information made available to the called party may be displayed on a telephone's display, on a separately attached device, or be processed by an attached computer with appropriate interface hardware.

The popularity of Caller ID services indicates that phone users, particularly mobile phone users, are interested in knowing contextual information about a phone call while the call is pending or in progress. However, existing systems provide only a minimum of contextual information (namely, the number and possibly the name of the caller).

As increasing numbers of mobile "smart" phones become connected to the Internet, the bare-bones context provided by Caller ID has become increasingly antiquated. However, while such smart phones are theoretically able to access many other sources of rich contextual data about a caller (e.g., the caller's social-network activity), existing systems do not allow even the smartest of smart phones to access such rich contextual data sources during the few seconds while a call or similar telephonic communication is pending.

DESCRIPTION

Figure 1:
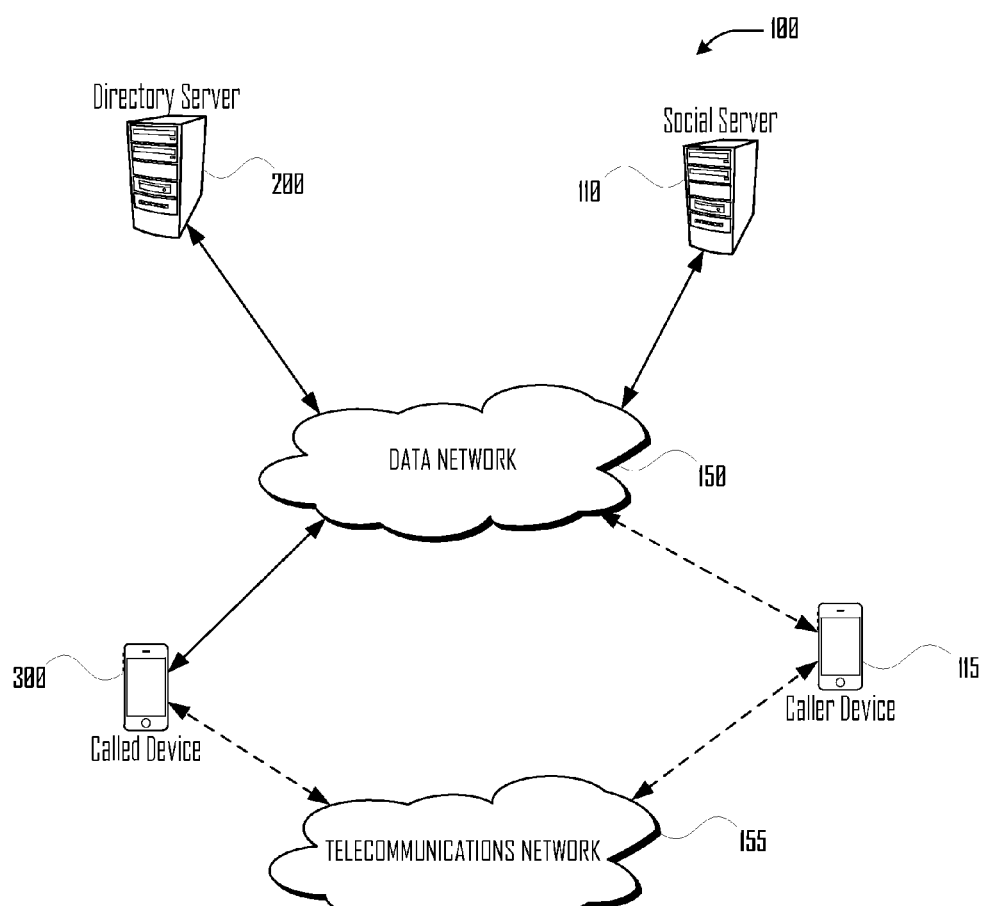
FIG. 1 illustrates a proactive caller context system in accordance with one embodiment.

In various embodiments as described herein, a directory server may proactively provide to a remote mobile phone (or similar device) recent contextual information associated with callers who are likely to call the remote mobile phone, such that the remote mobile phone is likely to have a local set of recent contextual data about a given caller when the caller places a call to the remote mobile phone (or visa versa). When an unknown caller calls the remote mobile phone, the directory server may use the caller's phone number to identify directory information and one or more social-network or similar accounts that are used as sources of contextual information about the caller.

The phrases "in one embodiment", "in various embodiments", "in some embodiments", and the like are used repeatedly. Such phrases do not necessarily refer to the same embodiment. The terms "comprising", "having", and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 illustrates a proactive caller context system in accordance with one embodiment. In the illustrated system, directory server 200, mobile telecommunications device 300, social-service provider 110, and (optionally) telecommunications device 115 are connected to data network 150. Additionally, one or both of mobile telecommunications device 300 and telecommunications device 115 may be connected to telecommunications network 155.

In various embodiments, directory server 200 may comprise one or more physical and/or logical devices that collectively provide the functionalities described herein. In some embodiments, directory server 200 may comprise one or more replicated and/or distributed physical or logical devices.

In some embodiments, directory server 200 may comprise one or more computing services provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

In various embodiments, social-service provider 110 may represent one or more devices operated by a "social network" provider, such as Facebook, provided by Facebook, Inc. of Palo Alto, Calif.; Twitter, provided by Twitter Inc. of San Francisco, Calif.; Foursquare, provided by Foursquare Labs, Inc. of New York, N.Y.; Yelp, provided by Yelp, Inc. of San Francisco, Calif.; Google+, provided by Google Inc. of Menlo Park, Calif.; and the like.

In various embodiments, data network 150 may include the Internet, a local area network ("LAN"), a wide area network ("WAN"), a cellular data network, and/or other data network.

In various embodiments, mobile telecommunications device 300 may include a mobile phone, satellite phone, tablet, laptop, desktop PC, or other mobile-telephony device that, among other things, allows a user to make and receive calls and other telephonic communications.

In various embodiments, telecommunications device 115 may include a landline telephone, mobile phone, satellite phone, tablet, laptop, desktop PC, or other mobile-telephony device that allows a caller to make calls and other telephonic communications.

In various embodiments, telephonic communications between telecommunications device 115 and mobile telecommunications device 300 are connected via telecommunications network 155, which transmits voice communications. In various embodiments, telecommunications network 155 may include a public switched telephone network ("PSTN"), a cellular network, a packet-switched network, and the like.

In some embodiments, telecommunications network 155 includes a PSTN that supports the Signaling System No. 7 (SS7) protocols, defined by International Telecommunication Union Telecommunication Standardization Sector (ITU-T). In particular, the telecommunications network 155 may support the ISDN User Part (ISUP) protocol of the SS7 protocols, which allows a switch in a PSTN to signal call-related information (e.g., called/calling party number, redirecting number, etc.) to the next switch in the PSTN.

In various embodiments, telecommunications network 155 is operated by a carrier, which is a provider of telecommunication services to its subscribers. Examples of carrier services may include Verizon Wireless, provided mainly by Verizon Communications Inc. of Basking Ridge, N.J.; AT&T Mobility, provided by AT&T Inc. of DeKalb County, Ga.; Sprint, provided by Sprint Nextel Corporation of Overland Park, Kans.; T-Mobile, provided by Deutsche Telecom AG of Bonn, Germany, and the like.

Figure 2:
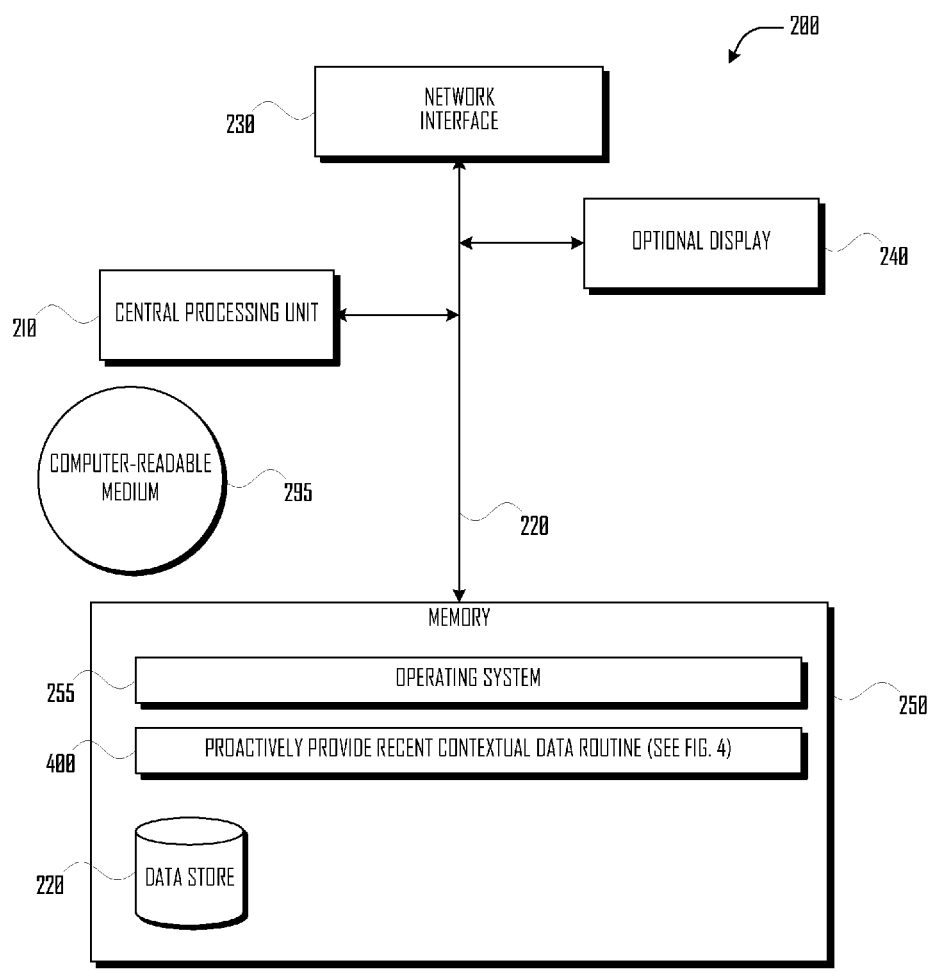
FIG. 2 illustrates several components of an exemplary directory server in accordance with one embodiment.

FIG. 2 illustrates several components of an exemplary directory server in accordance with one embodiment. In some embodiments, directory server 200 may include many more components than those shown in FIG. 2. However, it is not necessary that all of these generally conventional components be shown in order to disclose an illustrative embodiment.

Directory server 200 includes a bus 220 interconnecting components including a processing unit 210; a memory 350; display 340; and data and/or telecommunications network interface 330.

Memory 250 generally comprises a random access memory ("RAM"), a read only memory ("ROM"), and a permanent mass storage device, such as a disk drive. The memory 350 stores program code for a routine 500 for proactively providing recent contextual data associated with a caller (see FIG. 5, discussed below). In addition, the memory 250 also stores an operating system 255.

These and other software components may be loaded into memory 350 of directory server 200 using a drive mechanism (not shown) associated with a non-transient computer readable storage medium 295, such as a floppy disc, tape, DVD/CD-ROM drive, memory card, or the like. In some embodiments, software components may alternately be loaded via the data and/or telecommunications network interface 330, rather than via a non-transient computer readable storage medium 295.

Memory 350 also includes data store 220.

In some embodiments, directory server 200 may communicate with data store 220 via data and/or telecommunications network interface 330, a storage area network ("SAN"), a high-speed serial bus, and/or via the other suitable communication technology.

In some embodiments, data store 220 may comprise one or more storage services provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

In various embodiments, data store 220 includes a directory of identifying information (e.g., names), residence information (e.g., street addresses, latitude/longitude, or other geolocation data), and/or contact information (e.g., phone numbers, email addresses, and the like) for individuals in a certain geographic area (e.g., a nation, state, county, city, or the like).

Figure 3:
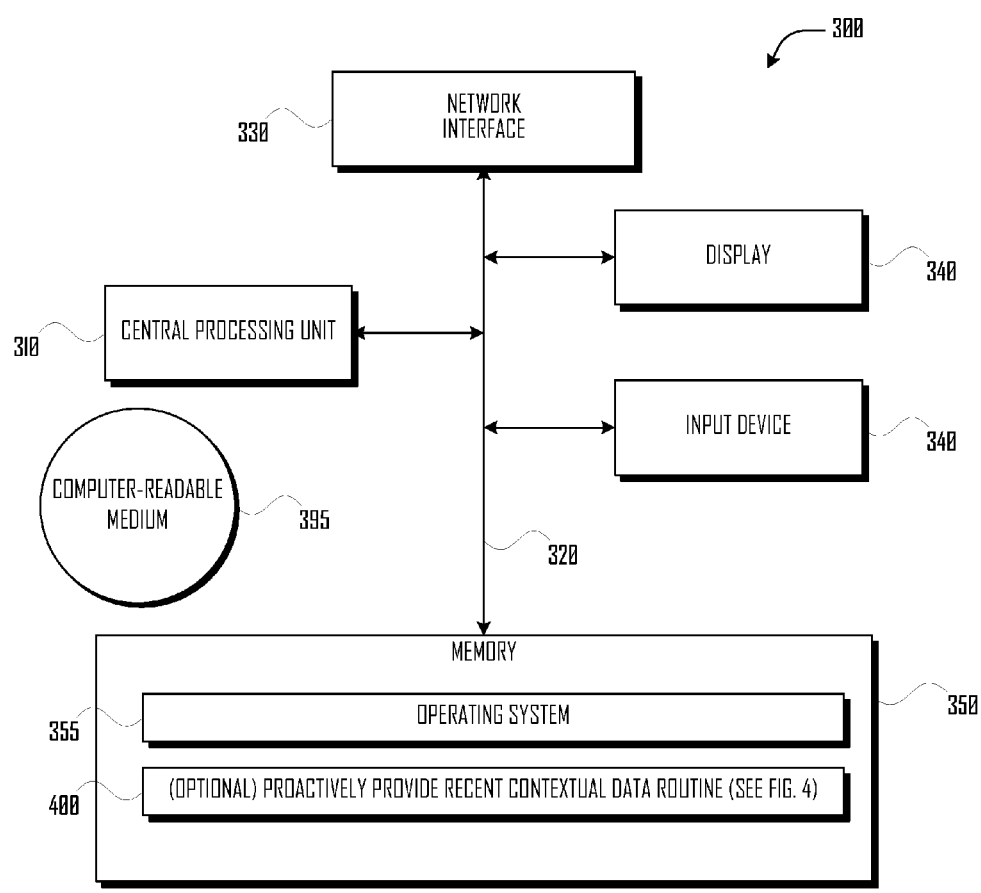
FIG. 3 illustrates several components of an exemplary mobile telecommunications device in accordance with one embodiment.

FIG. 3 illustrates several components of an exemplary mobile telecommunications device in accordance with one embodiment. In some embodiments, mobile telecommunications device 300 may include many more components than those shown in FIG. 3. However, it is not necessary that all of these generally conventional components be shown in order to disclose an illustrative embodiment.

Mobile telecommunications device 300 includes a bus 320 interconnecting components including a processing unit 310; a memory 350; display 340; and data and/or telecommunications network interface 330.

In various embodiments, input device 345 may include a mouse, track pad, touch screen, haptic input device, or other pointing and/or selection device.

Memory 350 generally comprises a random access memory ("RAM"), a read only memory ("ROM"), and a permanent mass storage device, such as a disk drive. In some embodiments, the memory 350 optionally stores program code for a routine 500 for proactively providing recent contextual data associated with a caller (see FIG. 5, discussed below). In addition, the memory 350 also stores an operating system 355.

These and other software components may be loaded into memory 350 of mobile telecommunications device 300 using a drive mechanism (not shown) associated with a non-transient computer readable storage medium 395, such as an external drive, memory card, or the like. In some embodiments, software components may alternately be loaded via the data and/or telecommunications network interface 330, rather than via a non-transient computer readable storage medium 395.

Figure 4:
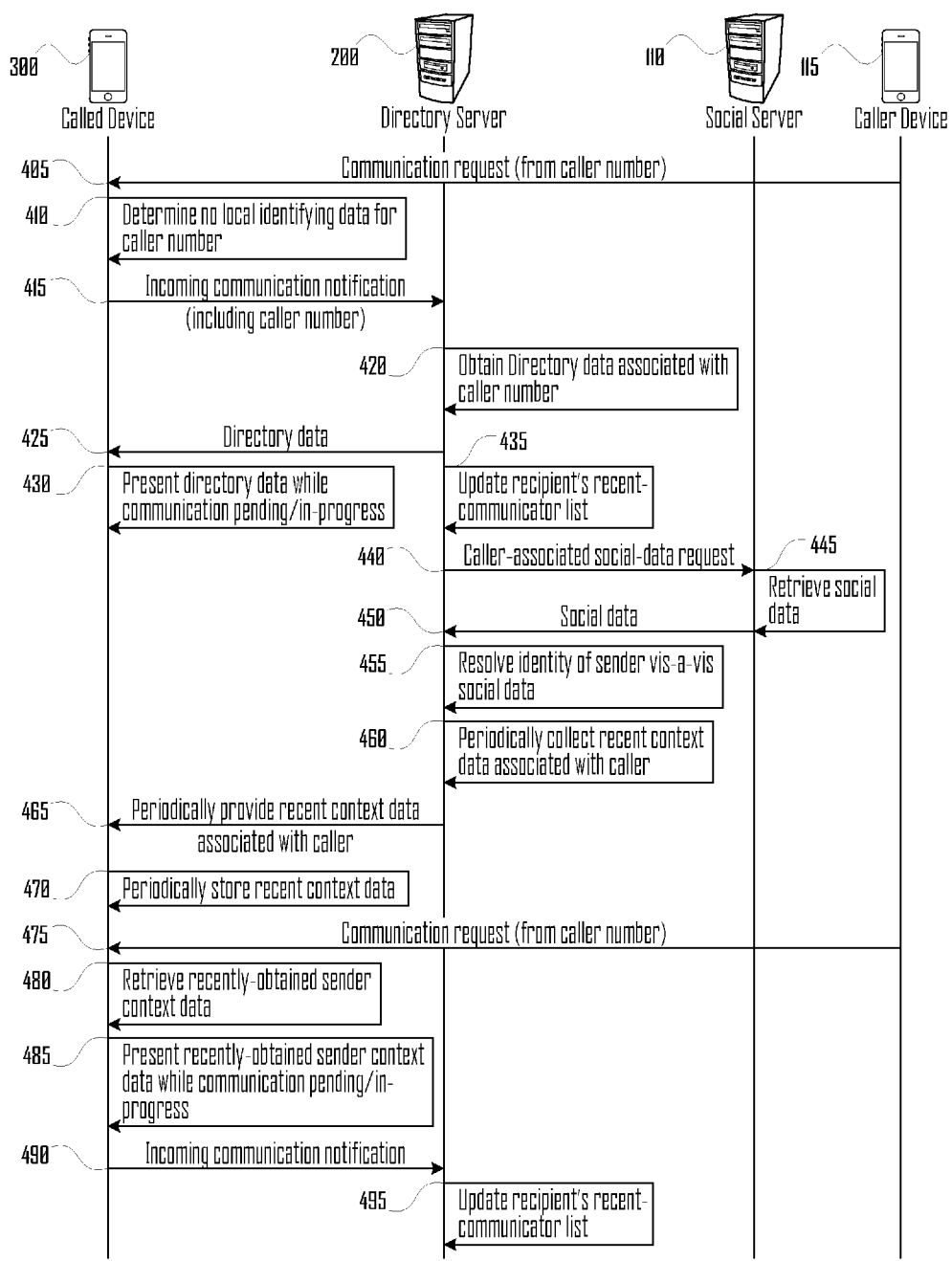
FIG. 4 illustrates an exemplary series of communications between directory server, mobile telecommunications device, social-service provider, and telecommunications device in accordance with one embodiment.

FIG. 4 illustrates an exemplary series of communications between directory server 200, mobile telecommunications device 300, social-service provider 110, and telecommunications device 115 in accordance with one embodiment.

Beginning the illustrated sequence of communications, telecommunications device 115 sends to mobile telecommunications device 300 a communication request 405, which includes (e.g., via the SS7 protocols) the number from which the caller is calling.

Mobile telecommunications device 300 determines 410 that is has no local identifying data associated with the caller number. For example, in some embodiments, mobile telecommunications device 300 may include or be able to access an address book and/or contacts list that associates identifying information (e.g., a first and/or last name of the caller, electronic and/or physical addresses associated with the caller, and the like) with various phone numbers. In the illustrated scenario, the caller is calling from a device that is identified only by its number. In other words, mobile telecommunications device 300 does not have any identifying information about the calling number.

Mobile telecommunications device 300 sends to directory server 200 an indication 415 that an unidentified caller has initiated a pending call or similar telephonic communication to mobile telecommunications device 300, the indication including the calling number.

Directory server 200 obtains 420 (e.g., from data store 220) directory data associated with caller number and sends to mobile telecommunications device 300 the directory data 425 thereby obtained.

In some embodiments, the directory data may include identifying information such as a first and/or last name associated with the calling number and/or a full or partial street address associated with the calling number. In some cases, little or no identifying directory data may be available for a given calling number, in which case, the directory data may be limited to a city or geographic region associated with, for example, an area-code portion of the calling number. However, in the illustrated scenario, the directory data includes at least a caller name associated with the calling number.

Mobile telecommunications device 300 presents 430 the directory data, including at least the caller's name, while the call remains pending or in-progress. Meanwhile, directory server 200 updates 435 a recent-communicator list associated with mobile telecommunications device 300. For example, in one embodiment, data store 220 may include one or more records in which are recorded recent calls, texts, and other communications between mobile telecommunications device 300 and other devices. In other embodiments, such a recent-communicator list may instead or in addition be stored and/or maintained on mobile telecommunications device 300.

Directory server 200 sends to social-service provider 110 a request 440 for social data that is or is likely to be associated with the caller name and/or the calling number. For example, in one embodiment, directory server 200 may send a request to search a social graph for people whose names and/or phone numbers match or are similar to those of the caller. Although the illustrated scenario depicts directory server 200 in communication with a single social-service provider, in many embodiments, directory server 200 may send multiple requests to multiple social-service providers for social-media account information associated with the caller.

Social-service provider 110 retrieves 445 the requested social data and sends it 450 to directory server 200. In turn, directory server 200 resolves 455 identity of sender vis-á-vis social data. For example, in some embodiments, social-service provider 110 may return public data associated with one or more social-media accounts having person-names that match or are similar to that of the caller. Social-service provider 110 may identify one of those social-media accounts as being associated with the caller by, for example, selecting the social-media account that has a phone number and/or location that matches calling number.

Directory server 200 periodically 460 collects recent context data associated with caller. For example, in one embodiment, directory server 200 may periodically obtain recent posts or other activity associated with the social-media account that was determined to be associated with the caller. In some embodiments, directory server 200 may instead or in addition periodically obtain recent weather forecasts, news items, or other information that is associated with the caller's geolocation (as determined according to the caller's phone number, directory-data, social-media account data, geolocation metadata associated with recent posts, or the like).

In various embodiments, directory server 200 may collect such context data on a schedule determined according to how frequently mobile telecommunications device 300 and the caller have communicated in the past or recent past. For example, in one embodiment, directory server 200 may collect recent context data associated with the caller every 30-60 minutes during times of day when the caller and mobile telecommunications device 300 have communicated in the past or recent past. In various embodiments, directory server 200 may adjust its context-data collection schedule based on additional factors such as how frequently context data associated with the caller is determined to be updated.

Periodically, as directory server 200 collects context data, directory server 200 provides the recent context data 465 to mobile telecommunications device 300, which periodically 470 stores the recent context data. As a result, mobile telecommunications device 300 will have recent context data locally available in the event that a new call or other telephonic communication is initiated in the near future.

At some point after mobile telecommunications device 300 receives and stores recent context data associated with the caller, telecommunications device 115 sends to mobile telecommunications device 300 a communication request (from caller number) 475. As a result of directory server's 200 proactively providing context data to mobile telecommunications device 300, mobile telecommunications device 300 is able to almost immediately retrieve 480 recently-obtained sender context data from local storage, such that mobile telecommunications device 300 is able to present 485 recently-obtained sender context data while the communication remains pending and/or in-progress.

Mobile telecommunications device 300 sends to directory server 200 an incoming communication notification 490. Directory server 200 updates 495 recipient's recent-communicator list. In some embodiments, directory server 200 may use such data to determine a schedule for collecting further context data associated with the caller. In other embodiments, such a recent-communicator list may instead or in addition be stored and/or maintained on mobile telecommunications device 300.

Figure 5:
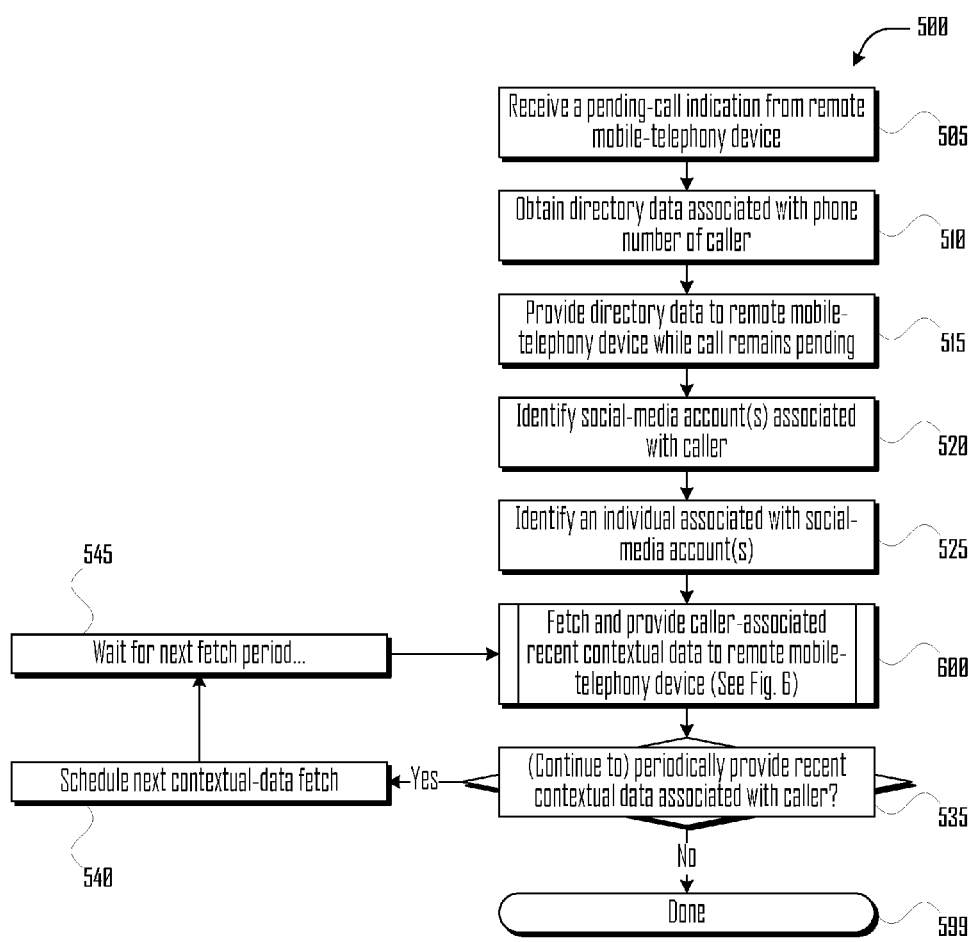
FIG. 5 illustrates a routine for proactively providing recent contextual data associated with a caller, such as may be performed by a directory server in accordance with one embodiment.

FIG. 5 illustrates a routine 500 for proactively providing recent contextual data associated with a caller, such as may be performed by a directory server 200 in accordance with one embodiment.

In block 505, routine 500 receives from a remote mobile telecommunications device (e.g., mobile telecommunications device 300) an indication that a caller has requested to initiate a telephonic communication with the remote mobile telecommunications device. For example, in one embodiment, an application running on mobile telecommunications device may detect an incoming call and notify routine 500 via data network 150. If the remote mobile telecommunications device does not have access to metadata identifying the caller (other than by the calling number), the mobile telecommunications device may request that routine 500 provide identifying information associated with the calling number.

In block 510, routine 500 obtains directory data associated with phone number of caller. As discussed above, in some embodiments, the directory data may include identifying information such as a first and/or last name associated with the calling number and/or a full or partial street address associated with the calling number. In some cases, little or no identifying directory data may be available for a given calling number, in which case, the directory data may be limited to a city or geographic region associated with, for example, an area-code portion of the calling number. In some embodiments, such directory data may be obtained from data store 220 or via communication with an alternate directory-data provider.

In block 515, routine 500 provides directory data to the remote mobile telecommunications device while the requested call or other telephonic communication remains pending (e.g., before the remote user has answered the call).

In block 520, routine 500 identifies one or more social-media accounts associated with caller. For example, as discussed above, in some embodiments, routine 500 may send a request (e.g., to social-service provider 110) to search a social graph for people whose names and/or phone numbers match or are similar to those of the caller. A social-service provider may respond with public metadata associated with one or more social-media accounts that match the search criteria. For example, in some embodiments, public metadata associated with a social-media account may include a person name, account name or ID, gender, and additional identifying information that the account owner has made public, such as an employer, home or work address, city or state of residence or business, and the like.

In block 525, routine 500 identifies an individual associated with at least one social-media account (as obtained in block 520). For example, in one embodiment, routine 500 may identify one of those social-media accounts as being associated with the caller by, for example, selecting the social-media account that has a phone number and/or location that matches calling number.

In subroutine block 600, routine 500 calls subroutine 600 (see FIG. 6, discussed below) to fetch and provide to the remote mobile telecommunications device recent contextual data associated with the caller. In various embodiments, recent contextual data may include data such as some or all of the following.

recent posts made by, to, about, and/or otherwise associated with the at least one social-media account (as identified in block 525);

recent local weather data and/or forecasts associated with a geolocation associated with the caller;

recent local news stories, headlines, or other like item associated with a geolocation associated with the caller; and the like.

In decision block 535, routine 500 determines whether to (continue to) periodically fetch and provide recent contextual data associated with the caller. For example, if routine 500 determines that the caller frequently communicates with the remote mobile telecommunications device, then in one embodiment, routine 500 may determine to continue periodically fetching and providing contextual data such that the remote mobile telecommunications device is likely to have a local cache of recent contextual data in the event of a new communication between mobile telecommunications device and the caller in the near future.

If routine 500 determines to (continue to) periodically fetch and provide recent contextual data associated with the caller, then routine 500 proceeds to block 540.

By contrast, if routine 500 determines that the caller does not frequently communicate or no longer frequently communicates with the remote mobile telecommunications device, then routine 500 may determine not to (continue to) periodically fetch and provide recent contextual data associated with the caller, in which case, routine 500 proceeds to ending block 599.

In block 540, routine 500 schedules a next instantiation of subroutine 600. For example, if in decision block 535, routine 500 determined that the caller is a frequent communicator with the remote mobile telecommunications device, then in block 540, routine 500 may schedule a next instantiation of subroutine 600 after a relatively short period of time (e.g., 30-60 minutes).

In some embodiments, routine 500 may consult a record of past communications to identify times of day and/or days of the week during which communications between the caller and the remote mobile telecommunications device have frequently taken place. Routine 500 may schedule more frequent contextual-data fetches during times of day and/or days of the week when the caller is more likely (based on past communications) to communicate with the remote mobile telecommunications device. Conversely, routine 500 may schedule less frequent contextual-data fetches (e.g., every hour, every eight hours, every day, or the like) when the caller is less likely to communicate with the remote mobile telecommunications device.

Similarly, in some embodiments, routine 500 may consult a record of past contextual-data fetches to determine whether it is attempting to fetch contextual data faster than the contextual-data is being updated and/or generated. For example, in one embodiment, if routine 500 determines that the caller generally posts contextual data to a particular social-network only once per day, then routine 500 may determine to fetch contextual data from that social-network on a daily basis (as opposed to hourly or semi-hourly).

In other embodiments, as an alternative or supplement to the scheduling processes described herein, routine 500 may take advantage of a publish-subscribe (or "pub/sub") facility provided by a social-network or other contextual-data source to be notified of and/or obtain recent contextual data associated with a given caller.

In block 545, routine 500 waits for the next instantiation (as scheduled in block 540) before proceeding to subroutine block 600.

Once routine 500 determines to no longer periodically provide contextual data associated with the caller to the remote mobile telecommunications device, routine 500 ends in ending block 599.

Figure 6:
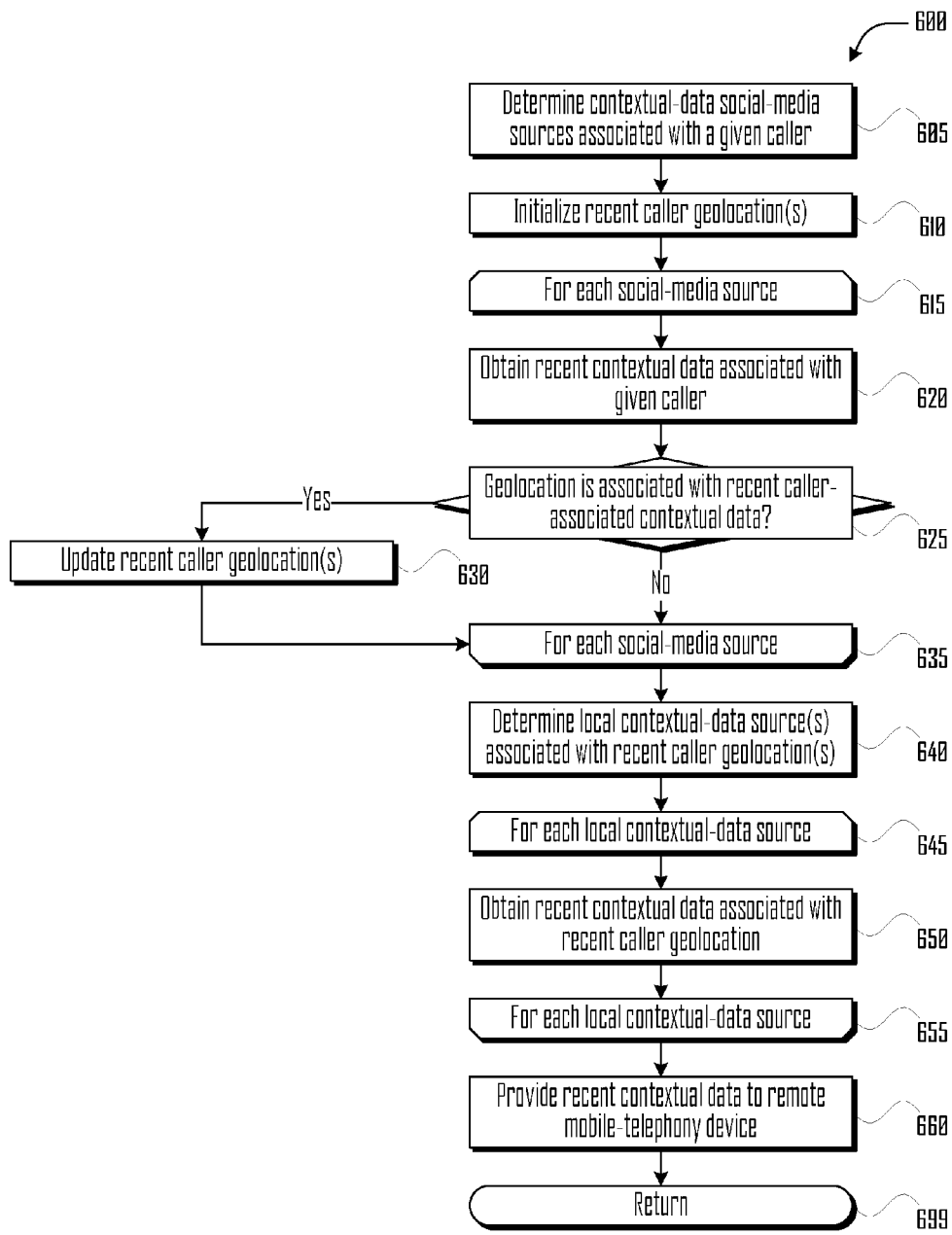
FIG. 6 illustrates a subroutine for periodically fetching recent contextual data associated with a caller, such as may be performed by a directory server in accordance with one embodiment.

FIG. 6 illustrates a subroutine 600 for periodically fetching recent contextual data associated with a caller, such as may be performed by a directory server 200 in accordance with one embodiment.

In block 605, subroutine 600 determines one or more contextual-data social-media sources associated with a given caller. For example, in one embodiment, the given caller may be associated with social-media accounts at one or more social-media providers. In such an embodiment, each of the one or more social-media providers may be determined to be a contextual-data social-media source.

In block 610, subroutine 600 initializes a suitable data structure for storing one or more recent caller geolocations, as may be determined below. In some embodiments, the data structure may be initialized to store a relatively permanent geolocation associated with the given caller such as region derived from an area-code associated with the given caller's phone number, an address associated with a social-media source associated with the given caller, or the like.

Beginning in opening loop block 615, subroutine 600 processes each contextual-data social-media source (as determined in block 605) in turn.

In block 620, subroutine 600 obtains recent contextual data associated with the given caller. For example, in various embodiments, subroutine 600 may query the current contextual-data social-media source to obtain recent messages, updates, photos, videos, check-ins, or other content that may have been posted to and/or uploaded from a social-media account associated with the given caller.

In decision block 625, subroutine 600 determines whether a geolocation is associated with the recent contextual data (as obtained in block 620). For example, in some embodiments, a message, video, photo, or check-in may be encoded or otherwise associated with metadata such as a place name (e.g., "Joe's Coffee Shop"); place coordinates (e.g., latitude and longitude); a place address (e.g., "123 Main St, Anytown USA"); or other like metadata describing a geolocation or from which a geolocation may be inferred.

If in decision block 625, subroutine 600 determines that the recent contextual data (as obtained in block 620) is associated with geolocation metadata and/or metadata from which a geolocation can be inferred, then subroutine 600 proceeds to block 630. In some embodiments, the geolocation metadata determined in decision block 625 may be relatively transient compared to relatively permanent geolocation metadata such as that associated with the caller's area code, residence, or the like.

Otherwise, subroutine 600 proceeds to ending loop block 635.

In block 630, subroutine 600 updates the geolocation data structure (as initialized in block 610) according to the geolocation metadata determined in decision block 625.

In ending loop block 635, subroutine 600 iterates back to opening loop block 615 to process the next contextual-data social-media source (as determined in block 605), if any.

In block 640, subroutine 600 determines one or more local contextual-data sources associated with geolocation stored in the geolocation data structure, as initialized in block 610 and as updated in one or more iterations of block 630.

For example, in some embodiments, local contextual-data sources may include sources of local weather data and/or local weather forecasts, local news sources (e.g., newspapers, neighborhood blogs), and other like sources of news, weather, and other information about a particular geographic area and/or region.

Beginning in opening loop block 645, subroutine 600 processes each local contextual-data source (as determined in block 640) in turn.

In block 650, subroutine 600 obtains, from the current local contextual-data source, recent contextual data (e.g., local news items, local weather, and the like) associated with a geolocation associated with the given caller.

In ending loop block 655, subroutine 600 iterates back to opening loop block 645 to process the next local contextual-data source (as determined in block 640), if any.

In block 660, subroutine 600 provides recent contextual data, as collected in iterations of block 620 and block 650, to the remote mobile telecommunications device, such that the mobile telecommunications device will be able to cache the contextual data and quickly display it when a communication with the given caller is pending or in progress.

Subroutine 600 ends in ending block 699, returning to the caller.

Although specific embodiments have been illustrated and described herein, it will be appreciated by those of ordinary skill in the art that alternate and/or equivalent implementations may be substituted for the specific embodiments shown and described without departing from the scope of the present disclosure. For example, in other embodiments, systems and methods similar to those described herein could be employed to proactively collect and provide recent contextual information about a prospective callee, such that a remote mobile phone is likely to have a local set of recent contextual data about the callee when the remote mobile phone initiates a call or other communication to the callee.

Similarly, in other embodiments, systems and methods similar to those described herein could be employed to collect and provide recent contextual information about an individual who may engage in non-telephonic communications with a remote mobile device, such that a remote mobile phone is likely to have a local set of recent contextual data about a given individual when the individual is engaged in non-telephonic communication with the remote mobile device, such as via a text message, instant message, online chat message, or the like.

Additionally, in other embodiments, systems and methods similar to those described herein could be employed to enable a mobile device itself to perform some or all of the functionalities described above in reference to routine 500 and/or subroutine 600 to proactively obtain recent contextual information about a remote individual who is likely to engage in communication with the mobile device. This application is intended to cover any adaptations or variations of the embodiments discussed herein.

The invention claimed is:

1. A computer-implemented method for providing contextual information about telephonic communications, the method comprising:

receiving, by the computer, an indication that a remote caller has initiated a pending telephonic communication to a remote mobile-telecommunications device, wherein said remote mobile-telecommunications device can identify said remote caller only by a phone number of said remote caller;

obtaining, by the computer, directory data associated with said phone number of said remote caller, said directory data further identifying said remote caller by at least a remote-caller name;

providing, by the computer, said directory data to said remote mobile-telecommunications device while said pending telephonic communication remains pending;

identifying, by the computer, a remote-caller social-media account associated with at least one of said remote-caller name and said phone number of said remote caller;

obtaining, by the computer, remote-caller identifying information identifying an individual associated with said remote-caller social-media account;

prior to said remote caller initiating a subsequent telephonic communication to said remote mobile-telecommunications device, periodically obtaining, by the computer, recent contextual data associated with said remote-caller social-media account and/or said remote-caller identifying information; and prior to said remote caller initiating said subsequent telephonic communication to said remote mobile-telecommunications device, periodically providing, by the computer, said recent contextual data to said remote mobile-telecommunications device to display in the event that said remote caller subsequently initiates said subsequent telephonic communication to said remote mobile-telecommunications device.

2. The method of claim 1, further comprising providing said remote-caller identifying information to said remote mobile-telecommunications device such that said remote mobile-telecommunications device can subsequently associate said phone number of said remote caller with said remote-caller identifying information.

3. The method of claim 1, wherein periodically obtaining said recent contextual data comprises obtaining a recent post associated with said remote-caller social-media account.

4. The method of claim 1, wherein periodically obtaining said recent contextual data comprises:

determining a recent geolocation associated with said remote caller; and obtaining at least one of a recent local news story and recent local weather data associated with said recent geolocation.

5. The method of claim 4, wherein determining said recent geolocation comprises:

obtaining a recent post associated with said remote-caller social-media account; and determining a geolocation associated with said recent post.

6. The method of claim 1, further comprising storing call data associated with said pending telephonic communication in a recent communications record associated with said remote mobile-telecommunications device.

7. A computing apparatus for providing contextual information about telephonic communications, the apparatus comprising a processor and a memory storing instructions that, when executed by the processor, configure the apparatus to:

receive an indication that a remote caller has initiated a pending telephonic communication to a remote mobile-telecommunications device, wherein said remote mobile-telecommunications device can identify said remote caller only by a phone number of said remote caller;

obtain directory data associated with said phone number of said remote caller, said directory data further identifying said remote caller by at least a remote-caller name;

provide said directory data to said remote mobile-telecommunications device while said pending telephonic communication remains pending;

identify a remote-caller social-media account associated with at least one of said remote-caller name and said phone number of said remote caller;

obtain remote-caller identifying information identifying an individual associated with said remote-caller social-media account;

prior to said remote caller initiating a subsequent telephonic communication to said remote mobile-telecommunications device, periodically obtain recent contextual data associated with said remote-caller social-media account and/or said remote-caller identifying information; and prior to said remote caller initiating said subsequent telephonic communication to said remote mobile-telecommunications device, periodically provide said recent contextual data to said remote mobile-telecommunications device to display in the event that said remote caller subsequently initiates said subsequent telephonic communication to said remote mobile-telecommunications device.

8. The apparatus of claim 7, wherein the memory stores further instructions that further configure the apparatus to provide said remote-caller identifying information to said remote mobile-telecommunications device such that said remote mobile-telecommunications device can subsequently associate said phone number of said remote caller with said remote-caller identifying information.

9. The apparatus of claim 7, wherein the instructions that configure the apparatus to periodically obtain said recent contextual data further comprise instructions configuring the apparatus to obtain a recent post associated with said remote-caller social-media account.

10. The apparatus of claim 7, wherein the instructions that configure the apparatus to periodically obtain said recent contextual data further comprise instructions configuring the apparatus to:

determine a recent geolocation associated with said remote caller; and obtain at least one of a recent local news story and recent local weather data associated with said recent geolocation.

11. The apparatus of claim 10, wherein the instructions that configure the apparatus to determine said recent geolocation further comprise instructions configuring the apparatus to:

obtain a recent post associated with said remote-caller social-media account; and determine a geolocation associated with said recent post.

12. The apparatus of claim 7, wherein the memory stores further instructions that further configure the apparatus to store call data associated with said pending telephonic communication in a recent communications record associated with said remote mobile-telecommunications device.

13. A non-transient computer-readable storage medium having stored thereon instructions that, when executed by a processor, configure the processor to:

receive an indication that a remote caller has initiated a pending telephonic communication to a remote mobile-telecommunications device, wherein said remote mobile-telecommunications device can identify said remote caller only by a phone number of said remote caller;

obtain directory data associated with said phone number of said remote caller, said directory data further identifying said remote caller by at least a remote-caller name;

provide said directory data to said remote mobile-telecommunications device while said pending telephonic communication remains pending;

identify a remote-caller social-media account associated with at least one of said remote-caller name and said phone number of said remote caller;

obtain remote-caller identifying information identifying an individual associated with said remote-caller social-media account;

prior to said remote caller initiating a subsequent telephonic communication to said remote mobile-telecommunications device, periodically obtain recent contextual data associated with said remote-caller social-media account and/or said remote-caller identifying information; and prior to said remote caller initiating said subsequent telephonic communication to said remote mobile-telecommunications device, periodically provide said recent contextual data to said remote mobile-telecommunications device to display in the event that said remote caller subsequently initiates said subsequent telephonic communication to said remote mobile-telecommunications device.

14. The storage medium of claim 13, having stored thereon further instructions that further configure the processor to provide said remote-caller identifying information to said remote mobile-telecommunications device such that said remote mobile-telecommunications device can subsequently associate said phone number of said remote caller with said remote-caller identifying information.

15. The storage medium of claim 13, wherein the instructions that configure the processor to periodically obtain said recent contextual data further comprise instructions configuring the processor to obtain a recent post associated with said remote-caller social-media account.

16. The storage medium of claim 13, wherein the instructions that configure the processor to periodically obtain said recent contextual data further comprise instructions configuring the processor to:

determine a recent geolocation associated with said remote caller; and obtain at least one of a recent local news story and recent local weather data associated with said recent geolocation.

17. The storage medium of claim 16, wherein the instructions that configure the processor to determine said recent geolocation further comprise instructions configuring the processor to:

obtain a recent post associated with said remote-caller social-media account; and determine a geolocation associated with said recent post.

18. The storage medium of claim 13, having stored thereon further instructions that further configure the processor to store call data associated with said pending telephonic communication in a recent communications record associated with said remote mobile-telecommunications device.

\* \* \* \* \*